US006687061B2

United States Patent
Sensui

(10) Patent No.: US 6,687,061 B2
(45) Date of Patent: Feb. 3, 2004

(54) WIDE-ANGLE LENS SYSTEM

(75) Inventor: Takayuki Sensui, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/202,857

(22) Filed: Jul. 26, 2002

(65) Prior Publication Data

US 2003/0067692 A1 Apr. 10, 2003

(30) Foreign Application Priority Data

Jul. 30, 2001 (JP) .......................................... 2001-229807

(51) Int. Cl.⁷ .............................. G02B 13/04; G02B 9/08
(52) U.S. Cl. ........................................ 359/749; 359/740
(58) Field of Search .............................. 359/749–753, 359/740, 680–682

(56) References Cited

U.S. PATENT DOCUMENTS

| | | | |
|---|---|---|---|
| 4,449,793 A | | 5/1984 | Nakamura et al. ........... 359/749 |
| 5,276,553 A | * | 1/1994 | Tatsuno ...................... 359/686 |
| 5,715,097 A | * | 2/1998 | Shibayama et al. .......... 359/691 |
| 6,384,987 B1 | | 5/2002 | Sensui ........................ 359/753 |

FOREIGN PATENT DOCUMENTS

| JP | 55147607 | 11/1980 |
|---|---|---|
| JP | 58202414 | 11/1983 |
| JP | 2001174700 | 6/2001 |
| JP | 2001228391 | 8/2001 |

OTHER PUBLICATIONS

English Language Abstract of JP 2001–174700.
English Language Abstract of JP 2001–228391.

* cited by examiner

*Primary Examiner*—Georgia Epps
*Assistant Examiner*—William Choi
(74) *Attorney, Agent, or Firm*—Greenblum & Bernstein, P.L.C.

(57) ABSTRACT

A wide-angle lens system includes a negative first lens group, a positive second lens group, a diaphragm, and a positive third lens group. Upon focusing, the positive second lens group moves along the optical axis direction. The negative first lens group includes at least one negative lens element having an aspherical concave surface facing toward the image, and satisfies the following condition:

$$1.0 < X1/f < 3.0 \qquad (1)$$

wherein $X1$ designates the distance between the aspherical surface on the optical axis to the diaphragm, and $f$ designates the focal length of the entire wide-angle lens system at an infinite photographing distance.

4 Claims, 14 Drawing Sheets

Fig. 1
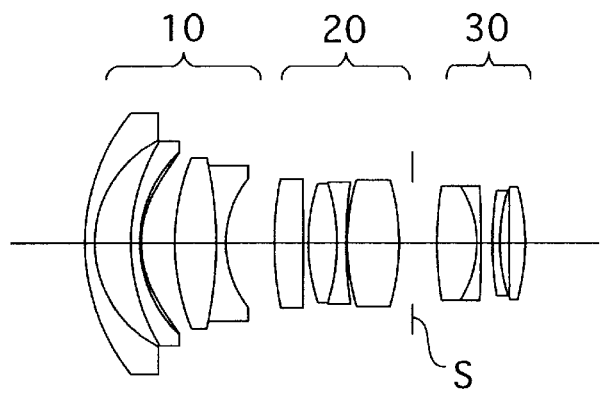
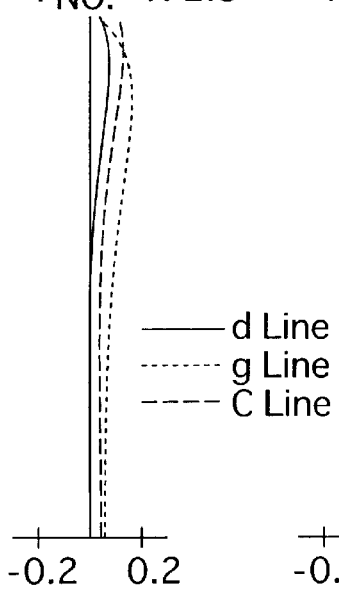
Fig. 2A
$F_{NO.}=1:2.8$
— d Line
---- g Line
--- C Line
-0.2  0.2
SPHERICAL
ABERRATION
CHROMATIC
ABERRATION
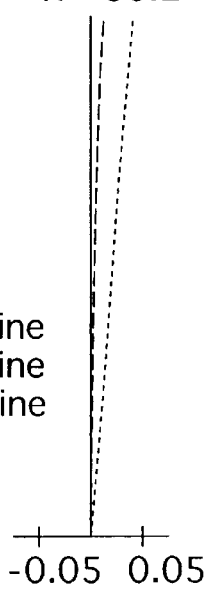
Fig. 2B
W= 50.2
-0.05  0.05
LATERAL
CHROMATIC
ABERRATION
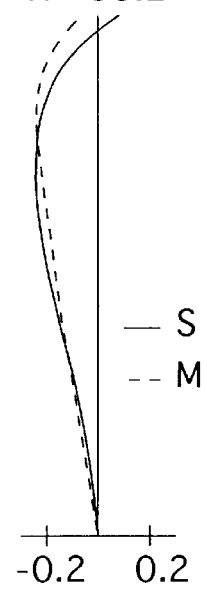
Fig. 2C
W= 50.2
— S
-- M
-0.2  0.2
ASTIGMATISM
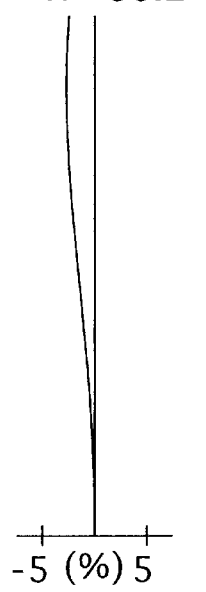
Fig. 2D
W= 50.2
-5 (%) 5
DISTORTION

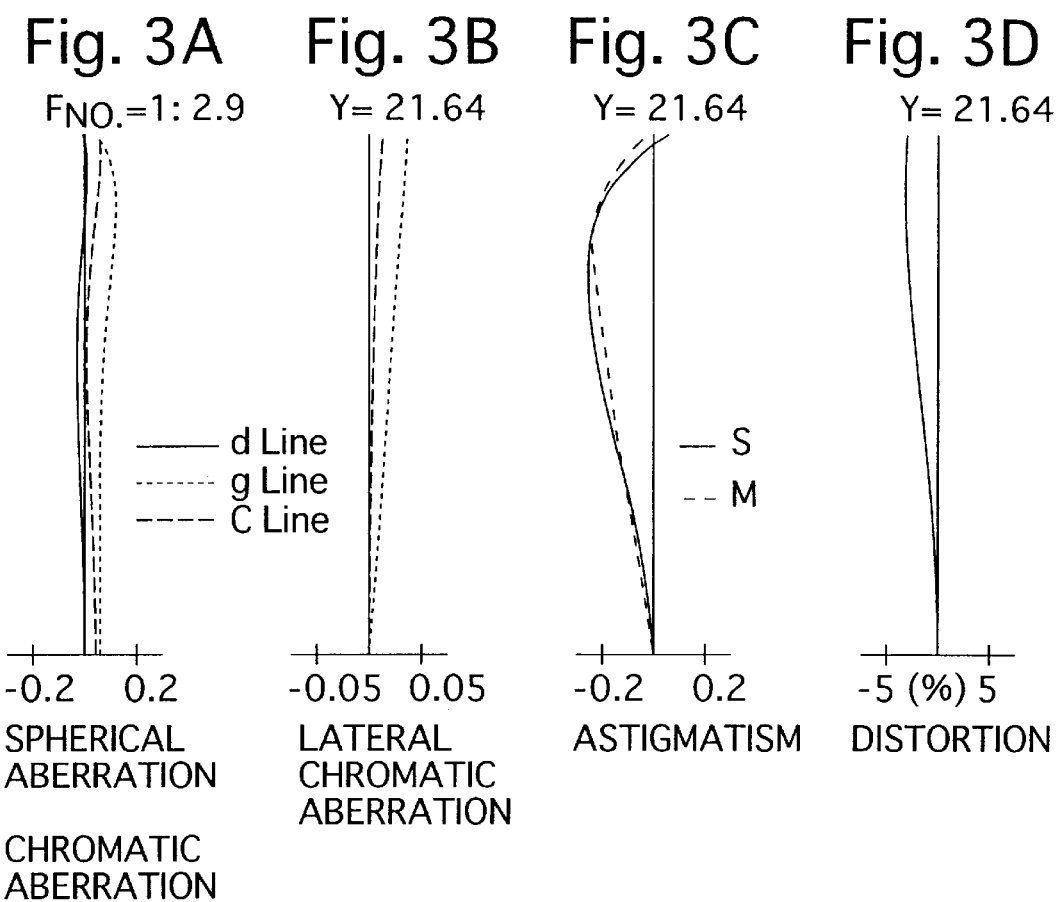

Fig. 4
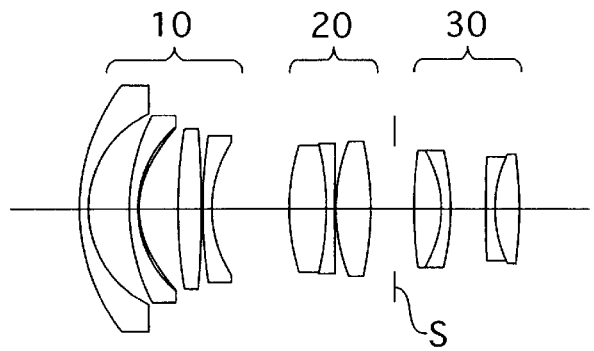
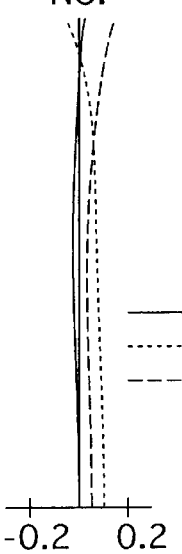
Fig. 5A
F_NO.=1:2.8
——— d Line
········ g Line
- - - - C Line
-0.2  0.2
SPHERICAL
ABERRATION
CHROMATIC
ABERRATION
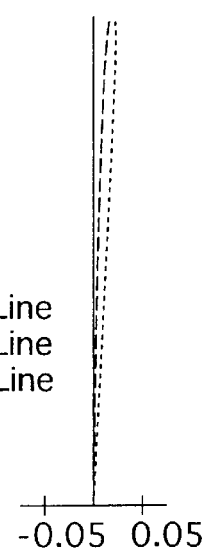
Fig. 5B
W= 50.2
-0.05 0.05
LATERAL
CHROMATIC
ABERRATION
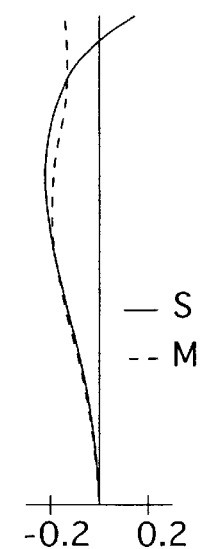
Fig. 5C
W= 50.2
——— S
- - M
-0.2  0.2
ASTIGMATISM
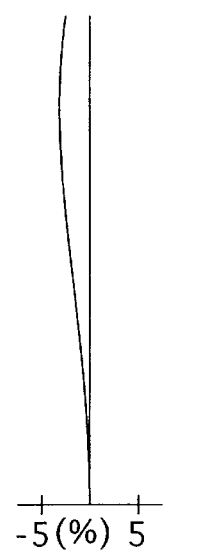
Fig. 5D
W= 50.2
-5(%) 5
DISTORTION

FNO.=1:2.9   Y=21.64   Y=21.64   Y=21.64

— d Line
---- g Line
---- C Line

— S
-- M

-0.2  0.2
SPHERICAL
ABERRATION
CHROMATIC
ABERRATION

-0.05  0.05
LATERAL
CHROMATIC
ABERRATION

-0.2  0.2
ASTIGMATISM

-5 (%) 5
DISTORTION $F_{NO.}$=1: 2.8
—— d Line
------- g Line
----- C Line
-0.2   0.2
SPHERICAL
ABERRATION
CHROMATIC
ABERRATION

W= 50.2
-0.05  0.05
LATERAL
CHROMATIC
ABERRATION

W= 50.2
—— S
-- M
-0.2   0.2
ASTIGMATISM

W= 50.2
-5 (%) 5
DISTORTION

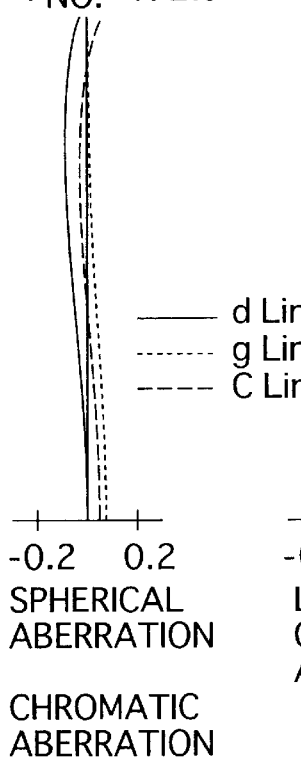
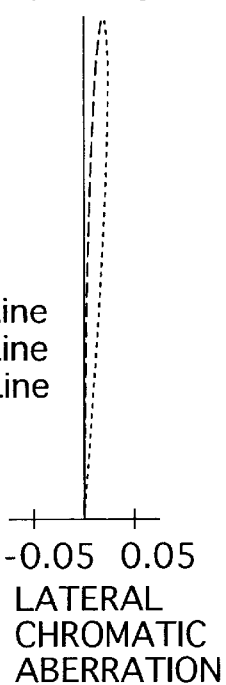
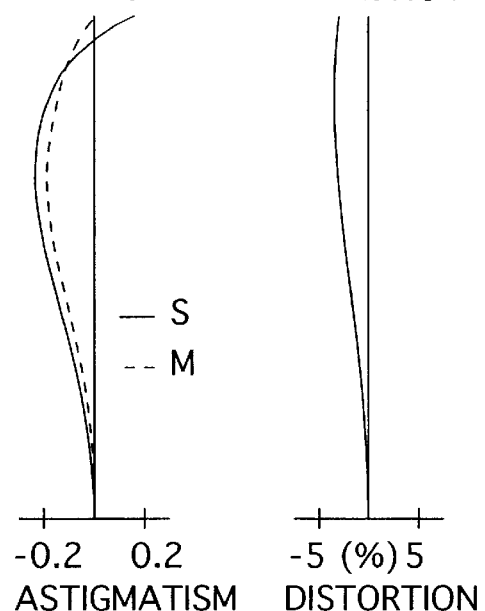
Fig. 9A  Fig. 9B  Fig. 9C  Fig. 9D

Fig. 10
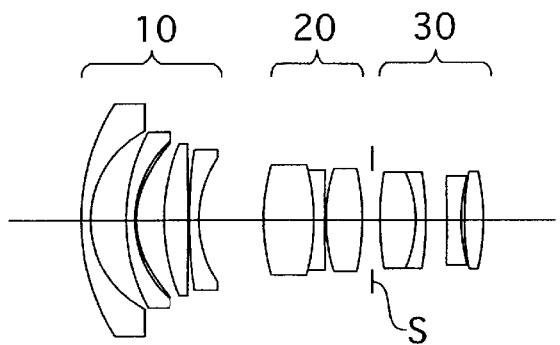
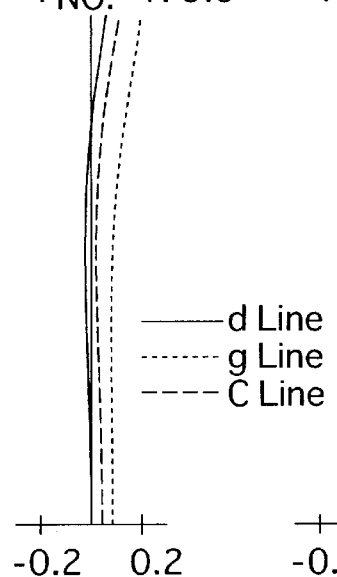
Fig. 11A
F_NO.=1:3.5
———— d Line
------- g Line
---- C Line
-0.2   0.2
SPHERICAL
ABERRATION
CHROMATIC
ABERRATION
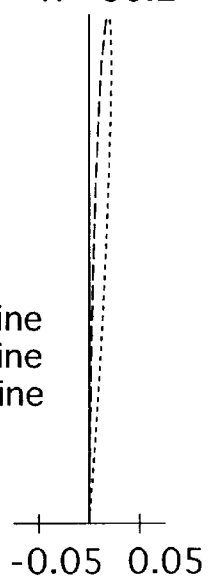
Fig. 11B
W= 50.2
-0.05  0.05
LATERAL
CHROMATIC
ABERRATION
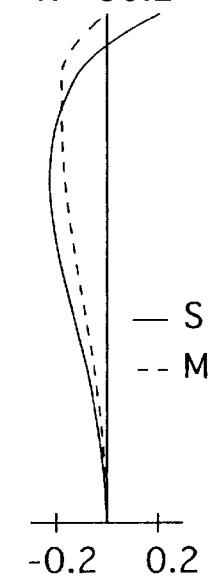
Fig. 11C
W= 50.2
— S
-- M
-0.2   0.2
ASTIGMATISM
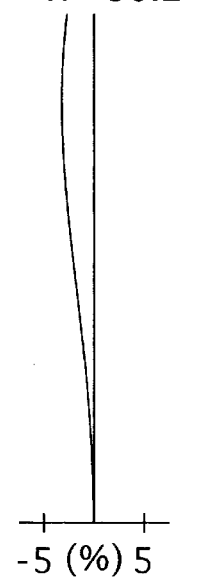
Fig. 11D
W= 50.2
-5 (%) 5
DISTORTION

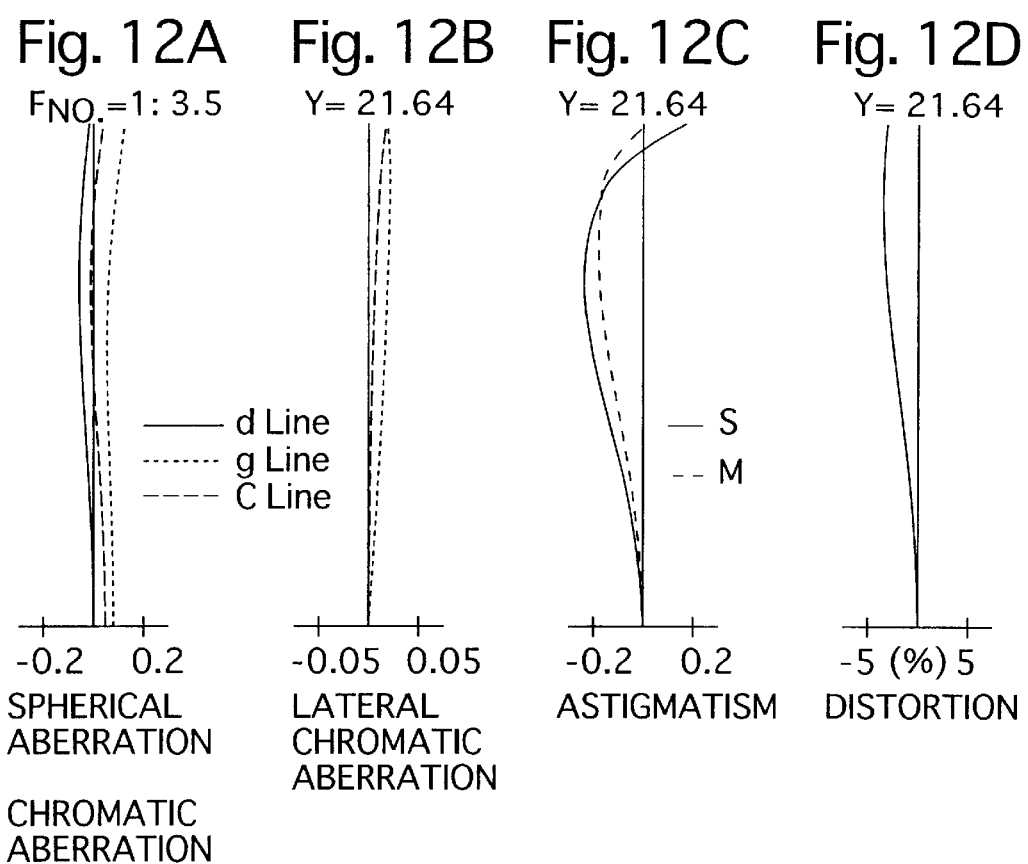

$F_{NO.}=1:3.5$  W= 50.3  W= 50.3  W= 50.3

— d Line
---- g Line
--- C Line

— S
-- M

-0.2  0.2
SPHERICAL
ABERRATION
CHROMATIC
ABERRATION

-0.05  0.05
LATERAL
CHROMATIC
ABERRATION

-0.2  0.2
ASTIGMATISM

-5 (%) 5
DISTORTION

F_{NO.}=1: 3.5

—— d Line
······· g Line
---- C Line

-0.2  0.2
SPHERICAL
ABERRATION

CHROMATIC
ABERRATION

Y= 21.64

-0.05  0.05
LATERAL
CHROMATIC
ABERRATION

Y= 21.64

— S
-- M

-0.2  0.2
ASTIGMATISM

Y= 21.64

-5 (%) 5
DISTORTION

Fig. 16
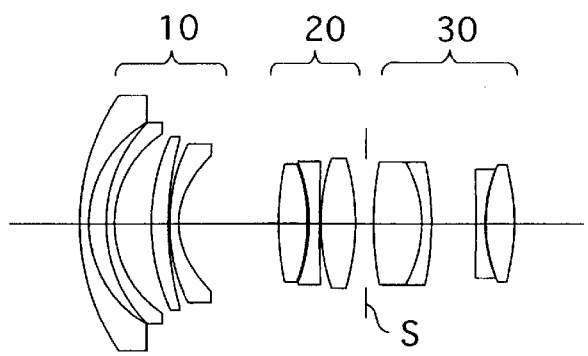
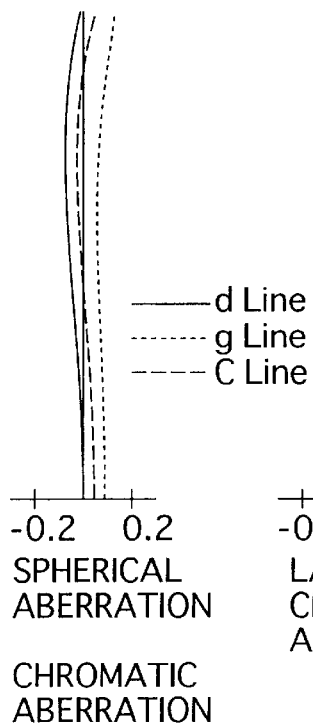
Fig. 17A
F_NO.=1: 2.9
—— d Line
········ g Line
---- C Line
-0.2   0.2
SPHERICAL
ABERRATION
CHROMATIC
ABERRATION
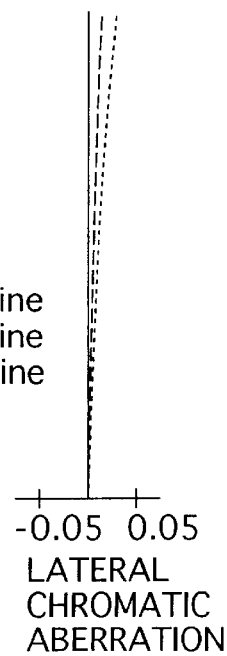
Fig. 17B
W= 50.5
-0.05  0.05
LATERAL
CHROMATIC
ABERRATION
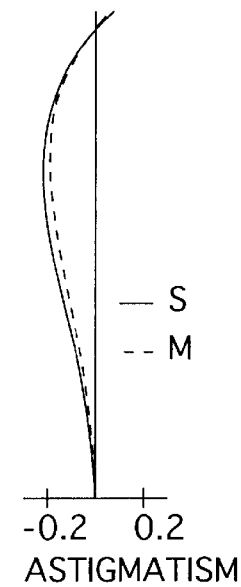
Fig. 17C
W= 50.5
—— S
-- M
-0.2   0.2
ASTIGMATISM
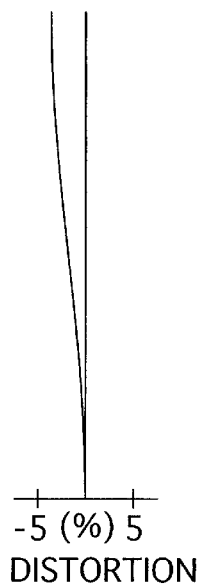
Fig. 17D
W= 50.5
-5 (%) 5
DISTORTION

F$_{NO.}$=1:3.0  Y=21.64  Y=21.64  Y=21.64

— d Line
······ g Line
---- C Line

— S
-- M

-0.2  0.2
SPHERICAL
ABERRATION
CHROMATIC
ABERRATION

-0.05  0.05
LATERAL
CHROMATIC
ABERRATION

-0.2  0.2
ASTIGMATISM

-5 (%) 5
DISTORTION

Fig. 19
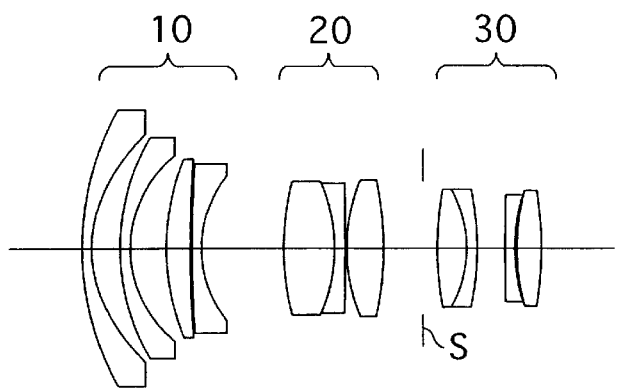
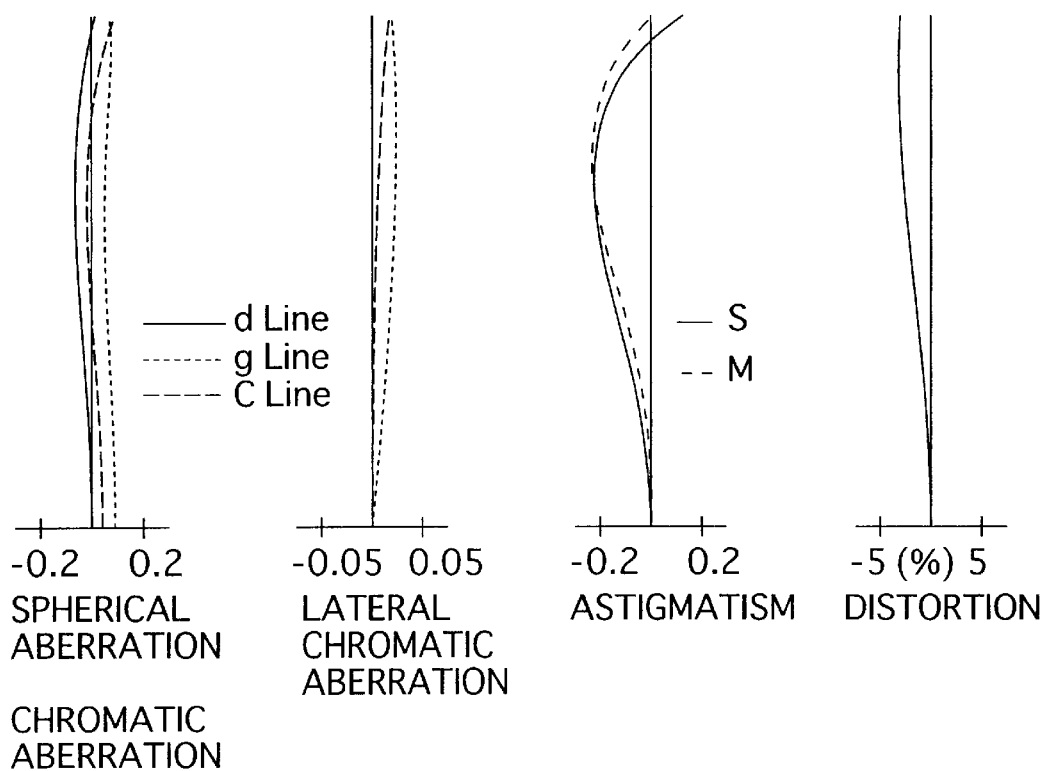
Fig. 20A
F_NO.=1: 2.9
Fig. 20B
W= 50.3
Fig. 20C
W= 50.3
Fig. 20D
W= 50.3
— d Line
---- g Line
---- C Line
— S
-- M
-0.2   0.2
SPHERICAL
ABERRATION
CHROMATIC
ABERRATION
-0.05  0.05
LATERAL
CHROMATIC
ABERRATION
-0.2   0.2
ASTIGMATISM
-5 (%) 5
DISTORTION

F_{NO.}=1:3.0

—— d Line
········ g Line
---- C Line

-0.2  0.2
SPHERICAL
ABERRATION

CHROMATIC
ABERRATION

Y= 21.64

-0.05  0.05
LATERAL
CHROMATIC
ABERRATION

Y= 21.64

— S
-- M

-0.2  0.2
ASTIGMATISM

Y= 21.64

-5 (%) 5
DISTORTION

WIDE-ANGLE LENS SYSTEM

BACKGROUND OF THE INVENTION

1. Field of the Invention

The present invention relates to a wide-angle lens system which is used in a single lens reflex (SLR) camera.

2. Description of the Prior Art

In a SLR camera, since a quick-return mirror is provided between the photographing lens system and the image plane, a back focal distance of a predetermined length is required for positioning the quick-return mirror. Accordingly, in a wide-angle lens system, a retrofocus lens system which has a back focal distance longer than the focal length is generally employed. Such a retrofocus lens system includes a front lens group having a negative refractive power (hereinafter, a negative front lens group), a diaphragm, and a rear lens group having a positive refractive power (hereinafter a positive rear lens group), in this order from the object. Since the distribution of refractive power is asymmetric with respect to the diaphragm, various aberrations, such as spherical aberration, coma, distortion, and astigmatism, tend to be larger. In order to correct such aberrations, it is necessary to increase the number of lens elements. Furthermore, in a lens system in which all the lens groups are advanced upon focusing, there is a need to increase the diameter of the front lens group to collect peripheral illumination. The front lens group of such a large diameter is remarkably seen in a fast super-wide-angle lens system having an f-number of 2.8 and the half angle-of-view of more than 50°. However, a lens system, in which the diameter of the front lens group is large and the number of lens elements is large, is disadvantageous for an automatic focusing (AF) operation, mainly because the weight of the lens groups to be moved becomes heavy. It is therefore preferable to employ an internal focusing lens system.

However, even in the case of an internal focusing lens system, if a super-wide-angle lens system is employed, the number of lens elements in the negative front lens group have to be increased in order to correct field curvature and distortion which are influenced by the angle-of-view, so that the thickness of the negative front lens group is increased. As a result, the diameter of the front lens group increases, and it becomes difficult for a user to handle the lens system.

SUMMARY OF THE INVENTION

The present invention provides a wide-angle lens system of inner-focusing and retrofocus type having three lens groups, in which the half angle-of-view of at least 45° (preferably, more than 50°), and an f-number of approximately between 2.8 and 4.0 are achieved.

As an aspect of the present invention, there is provided a wide-angle lens system including a negative first lens group, a positive second lens group, a diaphragm, and a positive third lens group, in this order from the object. Upon focusing, the positive second lens group moves along the optical axis direction. The negative first lens group includes at least one negative lens element having an aspherical concave surface facing toward the image, and the aspherical surface satisfies the following condition:

$$1.0 < X1/f < 3.0 \tag{1}$$

wherein

X1 designates the distance between the aspherical surface on the optical axis to the diaphragm, and f designates the focal length of the entire wide-angle lens system at an infinite photographing distance.

The aspherical surface formed on the concave surface of the negative lens element is preferably formed so that (i) the radius of curvature of the aspherical surface increases as an increase of a height from the optical axis, and (ii) satisfies the following condition:

$$-0.20 < (\Delta X/f)*(N-1) < -0.01 \tag{2}$$

wherein $\Delta X$ designates the amount of asphericity at a height Y (Y=0.33*(X1)), and N designates the refractive index of the lens material of the lens element on which the aspherical lens surface is formed.

The present disclosure relates to subject matter contained in Japanese Patent Application No. 2001-229807 (filed on Jul. 30, 2001) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a wide-angle lens system according to a first embodiment of the present invention, when an object at infinity is in an in-focus state;

FIGS. 2A, 2B, 2C and 2D show aberrations of the lens arrangement shown in FIG. 1;

FIGS. 3A, 3B, 3C and 3D show aberrations occurred in the lens arrangement shown in FIG. 1, when an object at the shortest photographing distance (x–1/10) is in an in-focus state;

FIG. 4 shows a lens arrangement of a wide-angle lens system according to a second embodiment of the present invention, when an object at infinity is in an in-focus state;

FIGS. 5A, 5B, 5C and 5D show aberrations of the lens arrangement shown in FIG. 4;

FIGS. 9A, 9B, 9C and 9D show aberrations occurred in the lens arrangement shown in FIG. 7, when an object at the shortest photographing distance (x–1/10) is in an in-focus state;

FIG. 10 shows a lens arrangement of a wide-angle lens system according to a fourth embodiment of the present invention, when an object at infinity is in an in-focus state;

FIGS 11A, 11B, 11C and 11D show aberrations of the lens arrangement shown in FIG. 10;

FIGS. 12A, 12B, 12C and 12D show aberrations occurred in the lens arrangement shown in FIG. 10, when an object at the shortest photographing distance (x–1/10) is in an in-focus state;

FIG. 16 shows a lens arrangement of a wide-angle lens system according to a sixth embodiment of the present invention, when an object at infinity is in an in-focus state;

FIGS. 17A, 17, 17C and 17D show aberrations of the lens arrangement shown in FIG. 16;

FIG. 19 shows a lens arrangement of a wide-angle lens system according to a seventh embodiment of the present invention, when an object at infinity is in an in-focus state;

FIGS. 20A, 20, 20C and 20D show aberrations of the lens arrangement shown in FIG. 19;

DESCRIPTION OF THE PREFERRED EMBODIMENTS

Figure 6A:
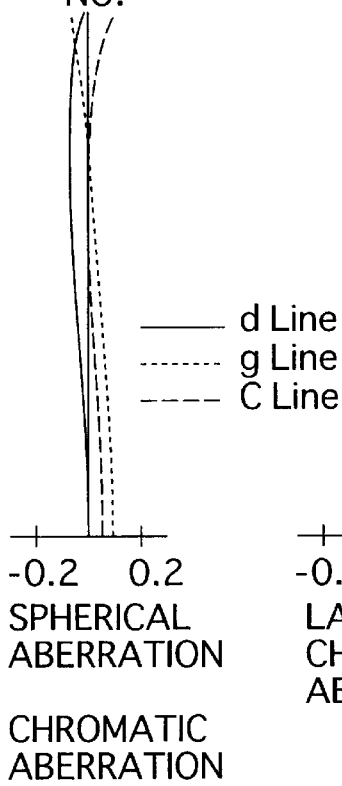
FIGS. 6A, 6B, 6C and 6D show aberrations occurred in the lens arrangement shown in FIG. 4, when an object at the shortest photographing distance (x–1/10) is in an in-focus state.
Figure 6B:
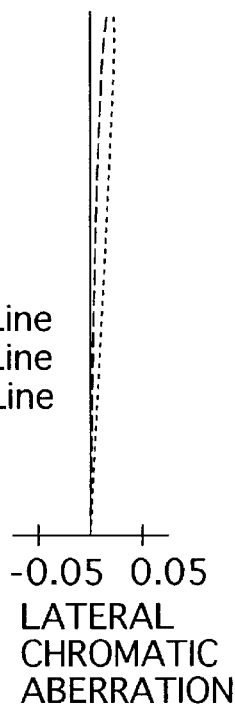
Figure 6C:
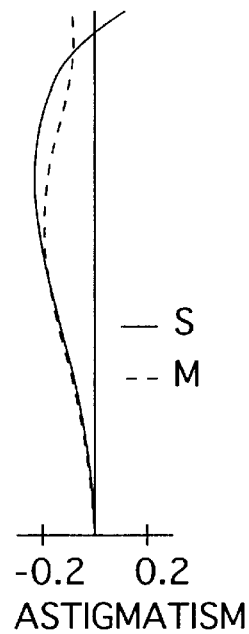
Figure 6D:
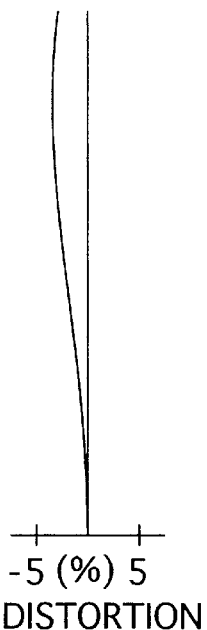

A wide-angle lens system of the present invention is an inner-focusing and retrofocus lens system including three lens groups, as shown in each embodiment of FIGS. 1, 4, 7, 10, 13, 16 and 19. The wide-angle lens system includes a negative first lens group 10, a positive second lens group 20, a diaphragm S, and a third lens group 30, in this order from the object. Upon focusing, the second lens group 20 moves from the object side toward the image side in accordance with a change in a photographic distance from infinity to a minimum photographing distance. If the positive second lens group 20 and the positive third lens group 30 are considered to be as a single positive rear lens group, the relationship thereof with respect to the negative first lens group (front lens group) 10 can be categorized as a retrofocus lens system. The diaphragm S is mounted on the object-side of the third lens group 30 (between the second lens group 20 and the third lens group 30). In a lens system in which a diaphragm is mounted on a fixed (immovable) lens group which is positioned on the image side with respect to a lens group to be moved upon focusing, the f-number does not largely vary even if focusing is carried out. In the wide-angle lens system of the present invention, the diaphragm S is mounted on the object-side of the positive third lens group 30 which is a fixed lens group and positioned on the image side with respect to the positive second lens group 20 to be moved upon focusing. Accordingly, in the wide-angle lens system of the present invention, the f-number does not largely vary even if focusing is carried out.

Condition (1) specifies the position of an aspherical surface in the first lens group 10. This aspherical surface can correct distortion and field curvature, and decrease the number of lens elements in the first lens group 10. Moreover, the aspherical surface can prevent an increase in the diameter of the front lens group (first lens group 10), and prevent an increase in the overall length of the entire lens system, both increases of which tend to be seen in a super-wide-angle lens system.

As explained, the aspherical surface in the negative first lens group 10 is formed on an image-side concave surface of the negative lens element due to the following reasons:

(1) In order to correct negative distortion in the wide-angle lens system, the power on the peripheral portion of a negative lens element, in the negative first lens group 10, which is distant from the diaphragm S should be weakened.

(2) For materializing the above, there are at least two options:

(a) the aspherical surface is formed on the object-side surface of the negative lens element so that the amount of asphericity becomes positive; and (b) the aspherical surface is formed on the image-side surface of the negative lens element so that the amount of asphericity becomes negative.

(3) According to option (a), the radius of curvature of the aspherical surface becomes smaller as an increase of a height from the optical axis, so that aberrations other than distortion increase. In other words, distortion is corrected by allowing other aberrations to become larger. Therefore a burden on the correcting of aberrations, which is imposed on an optical system on the side of the image from the aspherical surface, is increased.

(4) According to option (b), the radius of curvature of the aspherical surface becomes larger as an increase of a height from the optical axis, so that aberrations other than distortion decrease. In other words, aberrations are corrected by mutually canceling the same. Therefore a burden on the correcting of aberrations, which is imposed on an optical system on the side of the image from the aspherical surface, is decreased. Accordingly, in the present embodiments, the option (b) is employed, and the aspherical surface is formed on the image-side of a negative lens element in the negative first lens group 10.

Furthermore, the lens surfaces which are distant from the diaphragm allow a bundle of light to pass therethrough at different heights depending on each angle of view. If an aspherical surface is provided at such a point (height) where a bundle of light passes through, an independently desired lens shape in accordance to each angle of view can be obtained. Due to this arrangement, not only on-axis aberration (spherical aberration), but also off-axis aberrations, such as coma, field curvature, and distortion, can be effectively corrected.

If X1/f exceeds the lower limit of condition (1), the aspherical surface is too close to the diaphragm S, so that it becomes difficult to independently correct the off-axis aberrations in accordance to each angle of view.

If X1/f exceeds the upper limit of condition (1), the aspherical surface becomes too far away from the diaphragm S, so that the correcting of on-axis aberration becomes difficult. The overall length of the lens system and the diameter of the front lens group (first lens group 10) become larger, as a result.

Condition (2) specifies the amount of asphericity of the negative lens element in the negative first lens group 10.

If $(\Delta X/f)*(N-1)$ exceeds the upper limit of condition (2), the amount of asphericity decrease, and distortion and field curvature are undercorrected.

If $(\Delta X/f)*(N-1)$ exceeds the lower limit of condition (2), the amount of asphericity increase, and spherical aberration is undercorrected. Moreover, manufacture thereof becomes difficult.

Specific numerical data of the embodiments will be described hereinafter. In the diagrams of chromatic aberration (on-axis chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, M designates the meridional image, and Y designates an image height. In the tables, $F_{NO}$ designates the f-number, f designates the focal length of the entire wide-angle lens system, $f_B$ designates the back focal distance, w designates the half angle-of-view (°), r designates the radius of curvature, d designates the lens-element thickness or distance between lens elements, Nd designates the refractive index of the d-line, and v designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

FIG. 1 shows a lens arrangement of a wide-angle lens system, when an object at infinity is in an in-focus state. FIGS. 2A through 2D show aberrations of the lens arrangement shown in FIG. 1. FIGS. 3A through 3D show aberrations occurred in the lens arrangement shown in FIG. 1, when an object at the shortest photographing distance (x-1/10) is in an in-focus state. Table 1 shows the numerical data of the first embodiment.

The first lens group 10 includes a negative meniscus lens element having the convex surface facing toward the object, another negative meniscus lens element having the convex surface facing toward the object, and cemented lens elements having a positive lens element and a negative lens element, in this order from the object.

The second lens group 20 includes a positive lens element, cemented lens elements having a positive lens element and a negative lens element, and a positive lens element, in this order from the object.

The third lens group 30 includes a diaphragm S, cemented lens elements having a positive lens element and a negative lens element, a negative meniscus lens having the convex surface facing toward the object, and a positive lens element, in this order from the object.

Furthermore, the aspherical surface formed on the image-side surface of the image-side negative meniscus lens of the first lens group 10 is formed by a compound resin layer on a glass lens element (lens surfaces Nos. 4 and 5). The diaphragm S is provided 3.35 from the third lens group 30 (surface No. 16) on the object side.

TABLE 1

$F_{NO}$ = 1:2.8
f = 18.50
$f_B$ = 36.40
W = 50.2

| Surface No. | r | d | $N_d$ | v |
|---|---|---|---|---|
| 1 | 27.803 | 1.300 | 1.77250 | 49.6 |
| 2 | 15.324 | 4.882 | — | — |
| 3 | 25.892 | 1.200 | 1.78590 | 44.2 |
| 4 | 16.668 | 0.200 | 1.52700 | 43.7 |
| 5* | 13.291 | 4.501 | — | — |

TABLE 1-continued

| | | | | |
|---|---|---|---|---|
| 6 | 30.265 | 5.564 | 1.60729 | 49.2 |
| 7 | −52.597 | 1.300 | 1.72916 | 54.7 |
| 8 | 14.017 | 6.532 | — | — |
| 9 | 44.558 | 3.894 | 1.68893 | 31.1 |
| 10 | −720.528 | 0.666–2.260 | — | — |
| 11 | 25.495 | 3.856 | 1.58144 | 40.7 |
| 12 | −26.668 | 1.200 | 1.80610 | 40.9 |
| 13 | 54.861 | 0.200 | — | — |
| 14 | 30.162 | 7.000 | 1.57501 | 41.5 |
| 15 | −30.162 | 5.214–3.620 | — | — |
| 16 | 47.873 | 5.354 | 1.61800 | 63.4 |
| 17 | −14.435 | 0.601 | 1.80518 | 25.4 |
| 18 | −139.286 | 1.497 | — | — |
| 19 | 44.022 | 1.000 | 1.78590 | 44.2 |
| 20 | 23.527 | 1.262 | — | — |
| 21 | 485.677 | 2.190 | 1.58636 | 60.9 |
| 22* | −25.984 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 5 | −1.00 | 0.3965 × 10⁻⁷ | −0.3151 × 10⁻⁷ |
| 22 | 0.00 | 0.2824 × 10⁻⁴ | 0.1114 × 10⁻⁶ |

| Surf. No. | A8 | A10 |
|---|---|---|
| 5 | −0.6410 × 10⁻⁹ | 0.5660 × 10⁻¹² |
| 22 | 0.3911 × 10⁻⁹ | 0.00 |

[Embodiment 2]

FIG. 4 shows a lens arrangement of a wide-angle lens system, when an object at infinity is in an in-focus state. FIGS. 5A through 5D show aberrations of the lens arrangement shown in FIG. 4. FIGS. 6A through 6D show aberrations occurred in the lens arrangement shown in FIG. 4, when an object at the shortest photographing distance (x-1/10) is in an in-focus state. Table 2 shows the numerical data of the second embodiment.

The first lens group 10 includes a negative meniscus lens element having the convex surface facing toward the object, another negative meniscus lens element having the convex surface facing toward the object, a positive lens element, and a negative meniscus lens element having the convex surface facing toward the object, in this order from the object.

The second lens group 20 includes cemented lens elements having a positive lens element and a negative lens element, and a positive lens element, in this order from the object.

The third lens group 30 includes a diaphragm S, cemented lens elements having a positive lens element and a negative lens element, and cemented lens elements having a negative lens element and a positive lens element, in this order from the object.

Furthermore, the aspherical surface formed on the image-side surface of the image-side negative meniscus lens of the first lens group 10 is formed by a compound resin layer on a glass lens element (lens surfaces Nos. 4 and 5). The diaphragm S is provided 2.77 from the third lens group 30 (surface No. 15) on the object side.

TABLE 2

$F_{NO} = 1:2.9$
$f = 18.50$
$f_B = 36.40$
$W = 50.2$

| Surface No. | r | d | $N_d$ | ν |
|---|---|---|---|---|
| 1 | 28.393 | 1.300 | 1.77250 | 49.6 |
| 2 | 15.126 | 5.928 | — | — |
| 3 | 29.221 | 1.200 | 1.80400 | 46.6 |
| 4 | 15.552 | 0.200 | 1.52700 | 43.7 |
| 5* | 12.841 | 5.525 | — | — |
| 6 | 69.931 | 3.329 | 1.70756 | 29.8 |
| 7 | −149.328 | 0.200 | — | — |
| 8 | 68.952 | 1.300 | 1.72916 | 54.7 |
| 9 | 17.461 | 11.162–12.130 | — | — |
| 10 | 30.018 | 5.357 | 1.57500 | 41.3 |
| 11 | −38.891 | 1.200 | 1.80400 | 46.6 |
| 12 | 517.706 | 0.200 | — | — |
| 13 | 26.637 | 5.000 | 1.54814 | 45.8 |
| 14 | −44.991 | 6.207–5.240 | — | — |
| 15 | 64.626 | 3.917 | 1.48749 | 70.2 |
| 16 | −16.052 | 1.300 | 1.84666 | 23.8 |
| 17 | −36.852 | 5.047 | — | — |
| 18 | 203.557 | 1.300 | 1.85000 | 40.4 |
| 19 | 18.088 | 3.485 | 1.58636 | 60.9 |
| 20* | −47.442 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 5 | −1.00 | $0.1287 \times 10^{-4}$ | $-0.5973 \times 10^{-7}$ |
| 20 | 0.00 | $0.3443 \times 10^{-4}$ | $0.1927 \times 10^{-6}$ |

| Surf. No. | A8 | A10 |
|---|---|---|
| 5 | $-0.2137 \times 10^{-9}$ | $-0.1626 \times 10^{-11}$ |
| 20 | $-0.1022 \times 10^{-9}$ | 0.00 |

[Embodiment 3]

Figure 7:
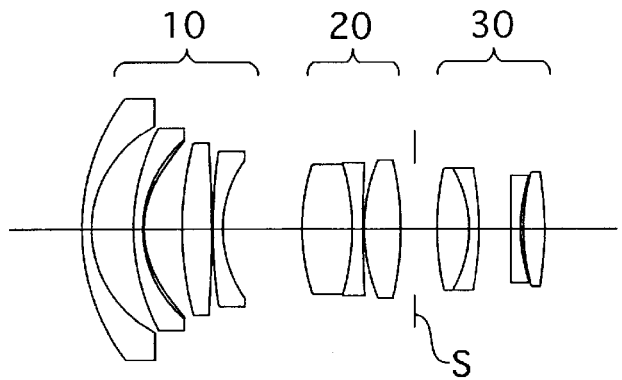
FIG. 7 shows a lens arrangement of a wide-angle lens system according to a third embodiment of the present invention, when an object at infinity is in an in-focus state.
Figure 8A:
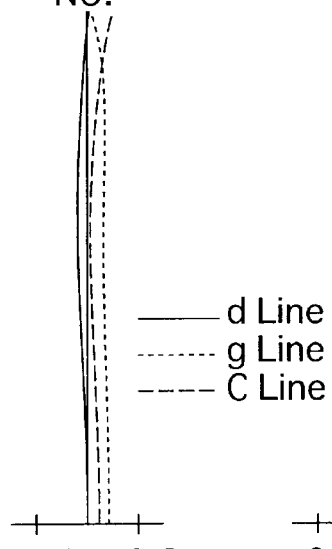
FIGS. 8A, 8B, 8C and 8D show aberrations of the lens arrangement shown in FIG. 7.
Figure 8B:
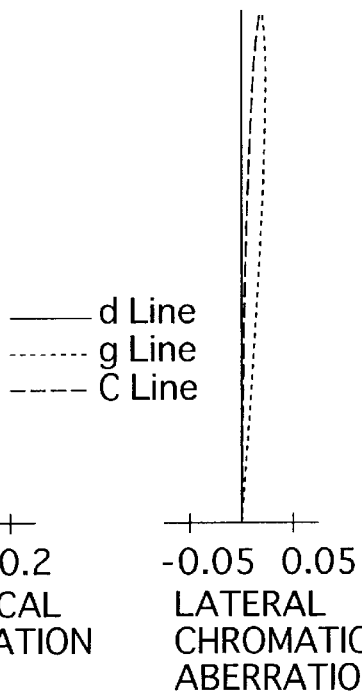
Figure 8C:
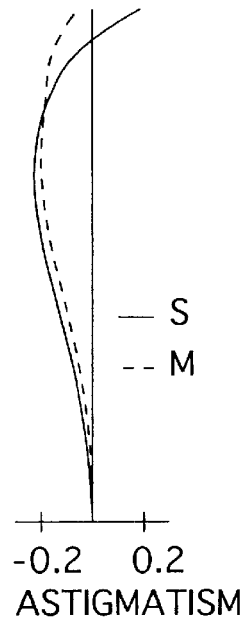
Figure 8D:
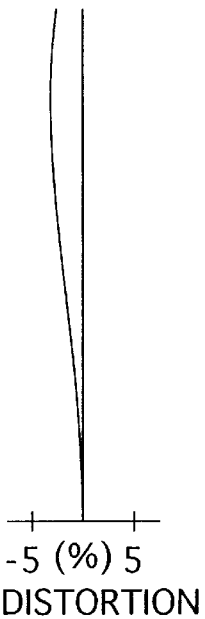

FIG. 7 shows a lens arrangement of a wide-angle lens system, when an object at infinity is in an in-focus state. FIGS. 8A through 8D show aberrations of the lens arrangement shown in FIG. 7. FIGS. 9A through 9D show aberrations occurred in the lens arrangement shown in FIG. 7, when an object at the shortest photographing distance $(x-\frac{1}{10})$ is in an in-focus state. Table 3 shows the numerical data of the third embodiment. The basic lens arrangement of the third embodiment is the same as that of the second embodiment except that the image-side cemented lens elements of the positive third lens group 30 are separated, and independently formed as a negative lens element and positive lens element. The diaphragm S is provided 3.03 from the third lens group 30 (surface No. 15) on the object side.

TABLE 3

$F_{NO} = 1:2.8$
$f = 18.50$
$f_B = 36.40$
$W = 50.2$

| Surface No. | r | d | $N_d$ | ν |
|---|---|---|---|---|
| 1 | 30.132 | 1.300 | 1.77250 | 49.6 |
| 2 | 15.858 | 5.666 | — | — |
| 3 | 30.134 | 1.200 | 1.80400 | 46.6 |
| 4 | 16.142 | 0.200 | 1.52700 | 43.7 |
| 5* | 13.143 | 5.107 | — | — |
| 6 | 46.067 | 3.989 | 1.64769 | 33.8 |
| 7 | −176.974 | 0.200 | — | — |
| 8 | 76.359 | 1.300 | 1.72916 | 54.7 |
| 9 | 16.482 | 10.939–11.910 | — | — |
| 10 | 28.649 | 7.000 | 1.62004 | 36.3 |
| 11 | −31.272 | 1.500 | 1.80400 | 46.6 |
| 12 | 157.074 | 0.200 | — | — |
| 13 | 25.092 | 5.000 | 1.51742 | 52.4 |
| 14 | −40.407 | 4.902–3.940 | — | — |
| 15 | 38.435 | 4.334 | 1.48749 | 70.2 |
| 16 | −16.753 | 1.400 | 1.84666 | 23.8 |
| 17 | −41.279 | 4.318 | — | — |
| 18 | −913.378 | 1.300 | 1.83400 | 37.2 |
| 19 | 23.412 | 0.407 | — | — |
| 20 | 29.213 | 2.906 | 1.58636 | 60.9 |
| 21* | −38.108 | — | — | — |

*designates the aspherical surface which is rotationally symmetrical with respect to the optical axis.

Aspherical surface data (the aspherical surface coefficients not indicated are zero (0.00):

| Surf. No. | K | A4 | A6 |
|---|---|---|---|
| 5 | −1.00 | $0.1185 \times 10^{-4}$ | $-0.6020 \times 10^{-7}$ |
| 21 | 0.00 | $0.3628 \times 10^{-4}$ | $0.1797 \times 10^{-6}$ |

| Surf. No. | A8 | A10 |
|---|---|---|
| 5 | $-0.1018 \times 10^{-9}$ | $-0.1129 \times 10^{-11}$ |
| 21 | $0.8524 \times 10^{-10}$ | 0.00 |

[Embodiment 4]

FIG. 10 shows a lens arrangement of a wide-angle lens system, when an object at infinity is in an in-focus state. FIGS. 1A through 11D show aberrations of the lens arrangement shown in FIG. 10. FIGS. 12A through 12D show aberrations occurred in the lens arrangement shown in FIG. 10, when an object at the shortest photographing distance $(x-\frac{1}{10})$ is in an in-focus state. Table 4 shows the numerical data of the fourth embodiment. The basic lens arrangement of the fourth embodiment is the same as that of the third embodiment. The diaphragm S is provided 1.00 from the third lens group 30 (surface No. 15) on the object side.

TABLE 4

$F_{NO} = 1:3.5$
$f = 18.50$
$f_B = 36.40$
$W = 50.2$

| Surface No. | r | d | $N_d$ | ν |
|---|---|---|---|---|
| 1 | 29.578 | 1.300 | 1.77250 | 49.6 |
| 2 | 13.764 | 4.892 | — | — |
| 3 | 25.291 | 1.200 | 1.80400 | 46.6 |
| 4 | 14.414 | 0.200 | 1.52700 | 43.7 |
| 5* | 11.542 | 3.867 | — | — |
| 6 | 27.533 | 3.289 | 1.65632 | 33.1 |
| 7 | −669.297 | 0.200 | — | — |
| 8 | 69.825 | 1.300 | 1.72916 | 54.7 |
| 9 | 15.016 | 8.969–9.830 | — | — |
| 10 | 27.328 | 7.000 | 1.62004 | 36.3 |
| 11 | −28.446 | 1.500 | 1.80400 | 46.6 |
| 12 | 205.397 | 0.200 | — | — |
| 13 | 23.242 | 5.000 | 1.51742 | 52.4 |
| 14 | −33.121 | 2.390–1.530 | — | — |

TABLE 4-continued

| | | | | |
|---|---|---|---|---|
| 15 | 40.798 | 4.865 | 1.48749 | 70.2 |
| 16 | −16.310 | 1.400 | 1.84666 | 23.8 |
| 17 | −41.713 | 2.906 | — | — |
| 18 | −408.606 | 1.949 | 1.83400 | 37.2 |
| 19 | 22.117 | 0.484 | — | — |
| 20 | 34.073 | 2.595 | 1.58636 | 60.9 |
| 21* | −27.465 | — | — | — |

*designates the aspherical surface which is rotationally symmetrical with respect to the optical axis.

Aspherical surface data (the aspherical surface coefficients not indicated are zero (0.00):

| Surf. No. | K | A4 | A6 |
|---|---|---|---|
| 5 | −1.00 | $0.1075 \times 10^{-4}$ | $-0.1138 \times 10^{-6}$ |
| 21 | 0.00 | $0.3891 \times 10^{-4}$ | $0.2605 \times 10^{-6}$ |

| Surf. No. | A8 | A10 |
|---|---|---|
| 5 | $-0.5587 \times 10^{-9}$ | $-0.2823 \times 10^{-11}$ |
| 21 | $0.2317 \times 10^{-9}$ | 0.00 |

[Embodiment 5]

Figures 13, 14A, 14B, 14C, 14D:
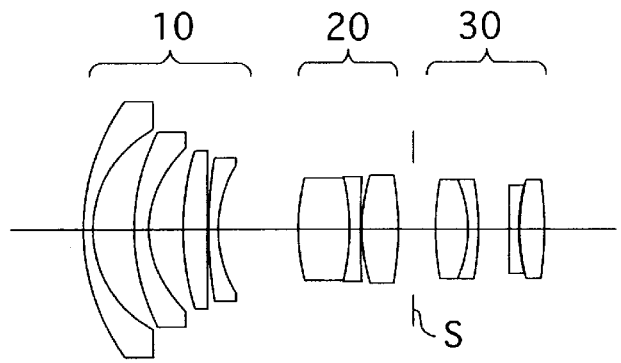
FIG. 13 shows a lens arrangement of a wide-angle lens system according to a fifth embodiment of the present invention, when an object at infinity is in an in-focus state.
FIGS. 14A, 14B, 14C and 14D show aberrations of the lens arrangement shown in FIG. 13.
Figure 15A:
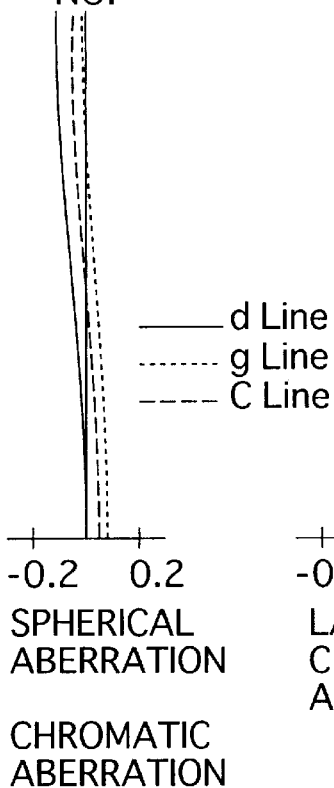
FIGS. 15A, 15, 15C and 15D show aberrations occurred in the lens arrangement shown in FIG. 13, when an object at the shortest photographing distance (x−1/10) is in an in-focus state.
Figure 15B:
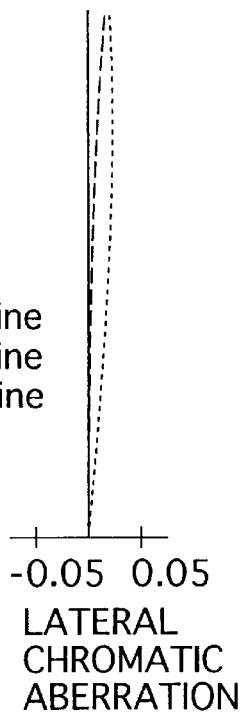
Figure 15C:
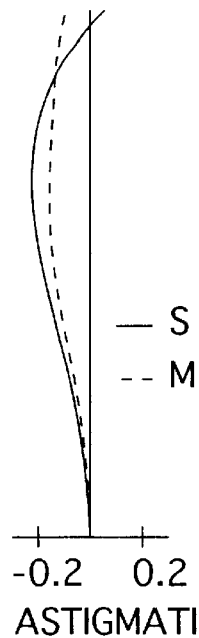
Figure 15D:
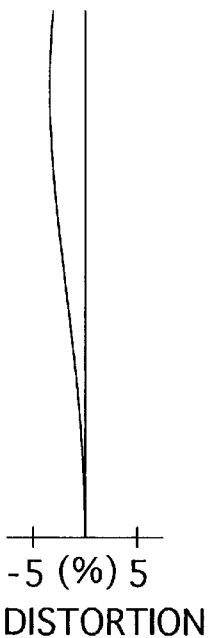
Figure 18A:
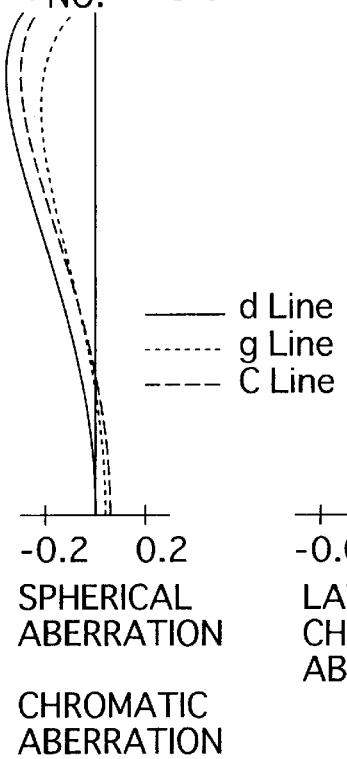
FIGS. 18A, 18, 18C and 18D show aberrations occurred in the lens arrangement shown in FIG. 16, when an object at the shortest photographing distance (x−1/10) is in an in-focus state.
Figure 18B:
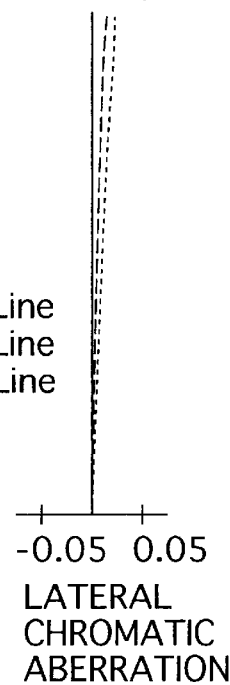
Figure 18C:
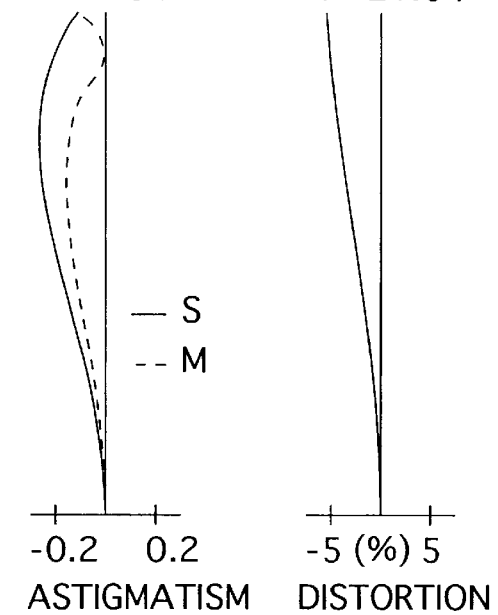
Figure 18D:
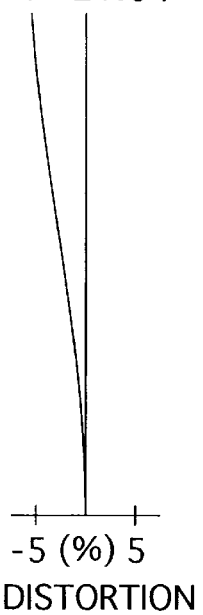
Figure 21A:
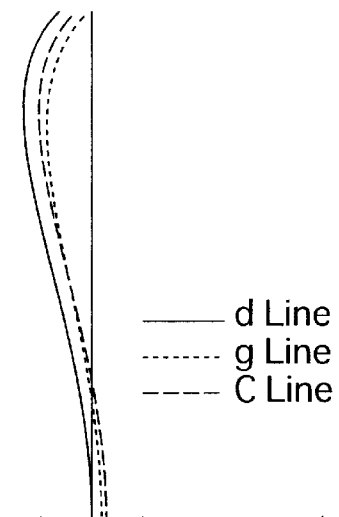
FIGS. 21A, 21, 21C and 21D show aberrations occurred in the lens arrangement shown in FIG. 19, when an object at the shortest photographing distance (x−1/10) is in an in-focus state.
Figure 21B:
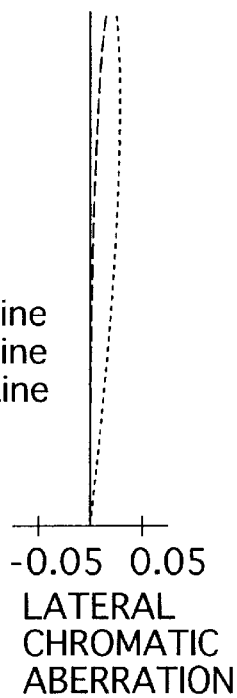
Figure 21C:
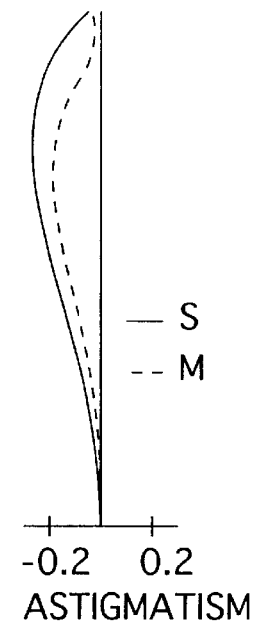
Figure 21D:
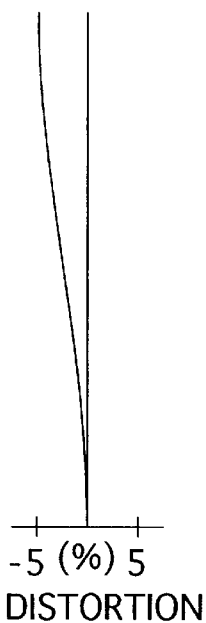

FIG. 13 shows a lens arrangement of a wide-angle lens system, when an object at infinity is in an in-focus state. FIGS. 14A through 14D show aberrations of the lens arrangement shown in FIG. 13. FIGS. 15A through 15D show aberrations occurred in the lens arrangement shown in FIG. 13, when an object at the shortest photographing distance (x-1/10) is in an in-focus state. Table 5 shows the numerical data of the fifth embodiment. The basic lens arrangement of the fifth embodiment is the same as that of the third embodiment except that the aspherical surface of the negative first lens group 10 is a machine-processed aspherical surface. The diaphragm S is provided 3.10 from the third lens group 30 (surface No. 14) on the object side.

TABLE 5

$F_{NO} = 1:3.5$
$f = 18.50$
$f_B = 36.40$
$W = 50.3$

| Surface No. | r | d | $N_d$ | ν |
|---|---|---|---|---|
| 1 | 29.837 | 1.300 | 1.77250 | 49.6 |
| 2 | 15.535 | 5.710 | — | — |
| 3 | 29.104 | 2.000 | 1.80400 | 46.6 |
| 4* | 13.057 | 4.791 | — | — |
| 5 | 36.364 | 3.365 | 1.64769 | 33.8 |
| 6 | 858.474 | 0.200 | — | — |
| 7 | 60.861 | 1.300 | 1.72916 | 54.7 |
| 8 | 16.808 | 11.008–11.880 | — | — |
| 9 | 29.511 | 7.000 | 1.62004 | 36.3 |
| 10 | −30.656 | 1.500 | 1.80400 | 46.6 |
| 11 | 154.715 | 0.200 | — | — |
| 12 | 24.439 | 5.000 | 1.51742 | 52.4 |
| 13 | −43.006 | 5.129–4.260 | — | — |
| 14 | 37.763 | 4.507 | 1.48749 | 70.2 |
| 15 | −16.566 | 1.400 | 1.84666 | 23.8 |
| 16 | −38.135 | 4.298 | — | — |
| 17 | −313.640 | 1.300 | 1.83400 | 37.2 |
| 18 | 23.702 | 0.157 | — | — |
| 19 | 26.234 | 3.434 | 1.58636 | 60.9 |
| 20* | −42.308 | — | — | — |

*designates the aspherical surface which is rotationally symmetrical with respect to the optical axis.

Aspherical surface data (the aspherical surface coefficients not indicated are zero (0.00):

| Surf. No. | K | A4 | A6 |
|---|---|---|---|
| 4 | −1.00 | $0.2062 \times 10^{-4}$ | $-0.1995 \times 10^{-7}$ |
| 20 | 0.00 | $0.4094 \times 10^{-4}$ | $0.1944 \times 10^{-6}$ |

| Surf. No. | A8 | A10 |
|---|---|---|
| 4 | $0.2183 \times 10^{-10}$ | $-0.1578 \times 10^{-11}$ |
| 20 | $-0.5076 \times 10^{-10}$ | 0.00 |

[Embodiment 6]

FIG. 16 shows a lens arrangement of a wide-angle lens system, when an object at infinity is in an in-focus state. FIGS. 17A through 17D show aberrations of the lens arrangement shown in FIG. 16. FIGS. 18A through 18D show aberrations occurred in the lens arrangement shown in FIG. 16, when an object at the shortest photographing distance (x-1/10) is in an in-focus state. Table 6 shows the numerical data of the sixth embodiment. The basic lens arrangement of the sixth embodiment is the same as that of the third embodiment except that (i) the aspherical surface of the negative first lens group 10 is formed on the image-side surface of the most image-side negative meniscus lens element, and (ii) the cemented lens elements of the second lens group 20 are separated, and independently formed as a positive lens element and a negative lens element. The diaphragm S is provided 1.05 from the third lens group 30 (surface No. 15) on the object side.

TABLE 6

$F_{NO} = 1:2.9$
$f = 18.50$
$f_B = 36.40$
$W = 50.5$

| Surface No. | r | d | $N_d$ | ν |
|---|---|---|---|---|
| 1 | 32.358 | 1.300 | 1.77250 | 49.6 |
| 2 | 16.575 | 2.498 | — | — |
| 3 | 20.292 | 1.200 | 1.77250 | 49.6 |
| 4 | 15.398 | 5.277 | — | — |
| 5 | 29.470 | 2.384 | 1.68667 | 31.2 |
| 6 | 43.823 | 0.200 | — | — |
| 7 | 25.523 | 1.300 | 1.80000 | 53.0 |
| 8* | 10.500 | 14.478–15.420 | — | — |
| 9 | 39.795 | 4.200 | 1.62664 | 35.6 |
| 10 | −23.221 | 0.275 | — | — |
| 11 | −22.338 | 1.500 | 1.80400 | 46.6 |
| 12 | 285.421 | 0.200 | — | — |
| 13 | 28.612 | 5.000 | 1.53740 | 47.7 |
| 14 | −32.060 | 2.601–1.660 | — | — |
| 15 | 45.079 | 6.994 | 1.48749 | 70.2 |
| 16 | −17.170 | 1.400 | 1.84666 | 23.8 |
| 17 | −42.431 | 6.498 | — | — |
| 18 | −282.430 | 1.300 | 1.83400 | 37.2 |
| 19 | 20.078 | 0.105 | — | — |
| 20 | 21.156 | 4.137 | 1.58636 | 60.9 |
| 21* | −27.341 | — | — | — |

*designates the aspherical surface which is rotationally symmetrical with respect to the optical axis.

Aspherical surface data (the aspherical surface coefficients not indicated are zero (0.00):

| Surf. No. | K | A4 | A6 |
|---|---|---|---|
| 8 | −1.00 | $0.3758 \times 10^{-4}$ | $-0.3151 \times 10^{-7}$ |
| 21 | 0.00 | $0.3102 \times 10^{-4}$ | $0.1164 \times 10^{-6}$ |

| Surf. No. | A8 | A10 |
|---|---|---|
| 8 | $-0.2401 \times 10^{-9}$ | $-0.6690 \times 10^{-11}$ |
| 21 | $0.1161 \times 10^{-9}$ | 0.00 |

[Embodiment 7]

FIG. 19 shows a lens arrangement of a wide-angle lens system, when an object at infinity is in an in-focus state. FIGS. 20A through 20D show aberrations of the lens arrangement shown in FIG. 19. FIGS. 21A through 21D show aberrations occurred in the lens arrangement shown in FIG. 19, when an object at the shortest photographing distance (x−1/10) is in an in-focus state. Table 7 shows the numerical data of the seventh embodiment. The basic lens arrangement of the seventh embodiment is the same as that of the third embodiment except that the aspherical surface of the first lens group 10 is formed on the image-side surface of the most object-side on negative meniscus lens element. The diaphragm S is provided 1.94 from the third lens group 30 (surface No. 14) on the object side.

TABLE 7

$F_{NO} = 1:2.9$
$f = 18.50$
$f_B = 36.40$
$W = 50.3$

| Surface No. | r | d | $N_d$ | ν |
|---|---|---|---|---|
| 1 | 38.017 | 1.300 | 1.77250 | 49.6 |
| 2* | 17.129 | 3.986 | — | — |
| 3 | 29.675 | 1.400 | 1.80400 | 46.6 |
| 4 | 16.140 | 4.978 | — | — |
| 5 | 32.243 | 3.262 | 1.70154 | 41.2 |
| 6 | 155.305 | 0.268 | — | — |
| 7 | 179.131 | 1.300 | 1.69680 | 55.5 |
| 8 | 15.708 | 11.428–12.340 | — | — |
| 9 | 36.669 | 7.000 | 1.62004 | 36.3 |
| 10 | −22.793 | 1.500 | 1.80400 | 46.6 |
| 11 | −610.631 | 0.200 | — | — |
| 12 | 24.696 | 5.000 | 1.51742 | 52.4 |
| 13 | −42.530 | 7.385–6.480 | — | — |
| 14 | 43.829 | 4.102 | 1.48749 | 70.2 |
| 15 | −16.217 | 1.400 | 1.84666 | 23.8 |
| 16 | −40.453 | 3.908 | — | — |
| 17 | 496.045 | 1.300 | 1.83400 | 37.2 |
| 18 | 24.654 | 0.281 | — | — |
| 19 | 30.148 | 3.454 | 1.58636 | 60.9 |
| 20* | −38.396 | — | — | — |

*designates the aspherical surface which is rotationally symmetrical with respect to the optical axis.

Aspherical surface data (the aspherical surface coefficients not indicated are zero (0.00):

| Surf. No. | K | A4 | A6 |
|---|---|---|---|
| 2 | −1.00 | $0.9350 \times 10^{-5}$ | $-0.5683 \times 10^{-8}$ |
| 20 | 0.00 | $0.2971 \times 10^{-4}$ | $0.1320 \times 10^{-6}$ |

| Surf. No. | A8 | A10 |
|---|---|---|
| 2 | $-0.1503 \times 10^{-10}$ | $-0.3274 \times 10^{-13}$ |
| 20 | $-0.7775 \times 10^{-10}$ | 0.00 |

The numerical values of each condition of each embodiment are shown in Table 8.

TABLE 8

|  | Condition (1) | Condition (2) |
|---|---|---|
| Embodiment 1 | 1.98 | −0.074 |
| Embodiment 2 | 1.98 | −0.086 |
| Embodiment 3 | 2.01 | −0.078 |
| Embodiment 4 | 1.77 | −0.075 |
| Embodiment 5 | 1.97 | −0.093 |
| Embodiment 6 | 1.47 | −0.044 |
| Embodiment 7 | 2.47 | −0.085 |

As can be understood from Table 8, each embodiment satisfies each condition. Furthermore, as can be understood from the aberration diagrams, the various aberrations are adequately corrected.

According to the above description, a wide-angle lens system of inner-focusing and retrofocus type having three lens groups, in which the half angle-of-view of at least 45° (preferably, more than 50°), and an f-number of approximately between 2.8 and 4.0 are achieved, can be obtained.

What is claimed is:

1. A wide-angle lens system comprising a negative first lens group, a positive second lens group, a diaphragm, and a positive third lens group, in this order from an object;

wherein upon focusing, said positive second lens group moves along the optical axis direction; and wherein said negative first lens group comprises at least one negative lens element having an aspherical concave surface facing toward an image, the wide-angle lens system has a single focal length, and said aspherical surface satisfies the following condition:

$$1.0 < X1/f < 3.0$$

wherein

X1 designates the distance between said aspherical surface on the optical axis to said diaphragm, and f designates the focal length of the entire wide-angle lens system at an infinite photographing distance.

2. The wide-angle lens system according to claim 1, wherein said aspherical surface formed on said concave surface of said negative lens element is formed so that (i) the radius of curvature of said aspherical surface increases as an increase of a height from the optical axis, and (ii) satisfies the following condition:

$$-0.20 < (\Delta X/f)*(N-1) < -0.01$$

wherein

ΔX designates the amount of asphericity at a height Y (Y=0.33*(X1)), and

N designates the refractive index of a lens material of said lens element on which said aspherical lens surface is formed.

3. The wide-angle lens system according to claim 1, wherein the wide-angle lens system is a non-zooming lens system.

4. A wide-angle lens system comprising:

a negative first lens group comprising at least one negative lens element having an aspherical concave surface facing toward an image;

a positive second lens group:

a diaphragm; and a positive third lens group, in this order from an object; wherein:

upon focusing, said positive second lens group moves along the optical axis direction; and the radius of curvature of said aspherical concave surface increases as an increase of a height from the optical axis, said aspherical concave surface satisfies the following conditions:

$$1.0 < X1/f < 3.0; \text{ and}$$

$$-0.20 < (\Delta X/f)*(N-1) < -0.01$$

wherein:

X1 designates the distance between said aspherical surface on the optical axis to said diaphragm;

f designates the focal length of the entire wide-angle lens system at an infinite photographing distance;

$\Delta X$ designates the amount of asphericity at a height Y (Y=0.33*(X1)); and N designates the refractive index of a lens material of said lens element on which said aspherical lens surface is formed.

* * * * *